(12) United States Patent
Ahn et al.

(10) Patent No.: US 9,046,706 B2
(45) Date of Patent: Jun. 2, 2015

(54) DISPLAY DEVICE AND METHOD FOR MANUFACTURING THE SAME

(75) Inventors: Sangku Ahn, Seoul (KR); JaeWoo Park, Gumi-si (KR); HyoJin Kim, Gyeongangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 270 days.

(21) Appl. No.: 13/556,874

(22) Filed: Jul. 24, 2012

(65) Prior Publication Data

US 2013/0236680 A1 Sep. 12, 2013

(30) Foreign Application Priority Data

Mar. 8, 2012 (KR) ........................ 10-2012-0023721

(51) Int. Cl.
| | | |
|---|---|---|
| B32B 3/02 | (2006.01) | |
| G02F 1/1333 | (2006.01) | |
| G02F 1/1335 | (2006.01) | |

(52) U.S. Cl.
CPC .... *G02F 1/133308* (2013.01); *G02F 1/133528* (2013.01); *G02F 2001/133317* (2013.01); *G02F 2201/54* (2013.01)

(58) Field of Classification Search
USPC ................................................ 428/68, 72, 78
See application file for complete search history.

(56) References Cited

U.S. PATENT DOCUMENTS

| | | | |
|---|---|---|---|
| 6,177,971 B1 | 1/2001 | Jung et al. | |
| 2006/0209502 A1 | 9/2006 | Sakata et al. | |
| 2007/0079537 A1* | 4/2007 | Lee ................. | 40/750 |
| 2007/0222912 A1 | 9/2007 | Sato et al. | |
| 2009/0199950 A1 | 8/2009 | Kitada et al. | |
| 2011/0260959 A1 | 10/2011 | Son et al. | |
| 2011/0261283 A1 | 10/2011 | Kim et al. | |
| 2012/0019745 A1 | 1/2012 | Do et al. | |

FOREIGN PATENT DOCUMENTS

| | | |
|---|---|---|
| CN | 101042492 A | 9/2007 |
| CN | 101528445 A | 9/2009 |
| CN | 102236180 A | 11/2011 |
| CN | 102346312 A | 2/2012 |
| JP | 2006221058 A | 8/2006 |
| JP | 2007094408 A | 4/2007 |
| JP | 2009145669 A | 7/2009 |
| JP | 2010217770 A | 9/2010 |
| JP | 2011065174 A | 3/2011 |
| JP | 2011-209470 | 10/2011 |
| JP | 2012000765 A | 1/2012 |
| KR | 1020050006362 A | 1/2005 |
| KR | 1020110094395 | 8/2011 |
| KR | 20110119527 A | 11/2011 |
| KR | 20120000625 A | 1/2012 |
| WO | WO 2006/129752 A1 | 12/2006 |

OTHER PUBLICATIONS

Office Action issued in Chinese Patent Application No. 201210268716.0, mailed Nov. 24, 2014, 23 pages.

* cited by examiner

*Primary Examiner* — Brent O'Hern
(74) *Attorney, Agent, or Firm* — Brinks Gilson & Lione

(57) ABSTRACT

Disclosed is a display device and a method for manufacturing the same, the display device comprising a display panel including an upper substrate, a lower substrate confronting the upper substrate, and a film member attached to a front surface of the upper substrate; a cover member receiving the display panel, and covering a lateral side of the display panel; and a bumper between the lateral side of the display panel and the cover member, wherein the film member is provided with an extending part which extends more than the end of the upper substrate by a predetermined range in a longitudinal direction.

10 Claims, 7 Drawing Sheets

DISPLAY DEVICE AND METHOD FOR MANUFACTURING THE SAME

This application claims the priority and the benefit under 35 U.S.C. §119(a) on Korean Patent Application No. 10 2012-0023721 filed on Mar. 28, 2012, the entire contents of which are hereby incorporated by reference.

BACKGROUND

1. Field of the Invention

The present disclosure relates to a display device, and more particularly, to a display device and a method for manufacturing the same, which enables to obtain a smaller thickness and a smaller front border width, and to remove height difference in border areas by removing some of case and set covers.

2. Discussion of the Related Art

Various flat panel display devices have been developed, for example, a liquid crystal display device, plasma display panel, field emission display device, light emitting display device, etc. The liquid crystal display device has received much attention due to its advantages of mass production technology, facilitation of a driving means, and high picture quality.

With the research and development in technical aspects of the flat panel display devices, the research and development in design aspects of a product that can appeal to consumers has especially received much attention. In this respect, efforts to minimize a thickness of a display device have been made, and the needs of a design having an increased aesthetic sense have been increased gradually to expedite purchase of consumers by appealing to aesthetic sense of the consumers.

However, designs for slimness of the display device or increase of the aesthetic sense of the display device have been developed in such a manner that elements for the display device have been adopted as they are. As such, there is a limitation in sliming the display device and developing a new design.

For example, according to the related art, the liquid crystal display device has necessarily required a lower case and an upper case to receive a display panel and a backlight unit. Also, in order to make the liquid crystal display device products such as notebook computers, monitors, mobile devices and televisions, separate front and rear set covers have been used additionally.

In this way, in addition to the lower case and the upper case, the front and rear set covers have been necessarily used, whereby reducing the thickness of the product of the liquid crystal display device or modifying the design of the liquid crystal display device has been limited. Especially, the upper case and front set cover inevitably cover the front border areas of the display panel in the liquid crystal display device, which causes the thick liquid crystal display device. Also, the border width is increased in the liquid crystal display device, and the height difference in the border areas causes difficulties in providing innovative design.

BRIEF SUMMARY

A display panel including an upper substrate, a lower substrate confronting the upper substrate, and a film member attached to a front surface of the upper substrate; a cover member receiving the display panel, and covering a lateral side of the display panel; and a bumper between the lateral side of the display panel and the cover member, wherein the film member is provided with an extending part which extends beyond the end of the upper substrate in a longitudinal direction or a latitude direction, or both directions and the bumper supports a rear surface of the extending part, and extends beyond the end of the extending part in the longitudinal direction or a latitude direction, or both directions. In the present specification, "longitudinal direction" is the direction along the longer side of the display device and the "latitude direction" is the direction along the shorter side of the display device. When the display is square, either direction can be a "longitudinal direction" and the other direction perpendicular to the longitudinal direction can be the "latitude direction".

In another aspect of the present invention, there is provided a method for manufacturing a display device of the present invention, comprising: forming a film member on a front surface of an upper substrate, the film member extending beyond the end of the upper substrate in a longitudinal direction or a latitude direction, or both directions; forming a bumper extending from a lateral side of the upper substrate and supporting the film member, the bumper extending beyond the end of the film member in a longitudinal direction or a latitude direction, or both directions; and forming a cover member to receive the upper substrate, film member and bumper.

It is to be understood that both the foregoing general description and the following detailed description of the present invention are exemplary and explanatory and are intended to provide further explanation of the invention as claimed without an intention to limit the present invention to the detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE DRAWINGS AND THE PRESENTLY PREFERRED EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

On explanation about the embodiments of the present invention, if it is mentioned that a first structure is positioned 'on or above' or 'under or below' a second structure, it should be understood that the first and the second structures are brought into contact with each other, or a third structure is interposed between the first and second structures. And if it is mentioned that a first structure extends more than a second structure 'longitudinally' or 'in a longitudinal direction', it should be understood that the first structure extends more than a second structure in a longitudinal direction, or a latitude direction, or both directions.

Figure 1:
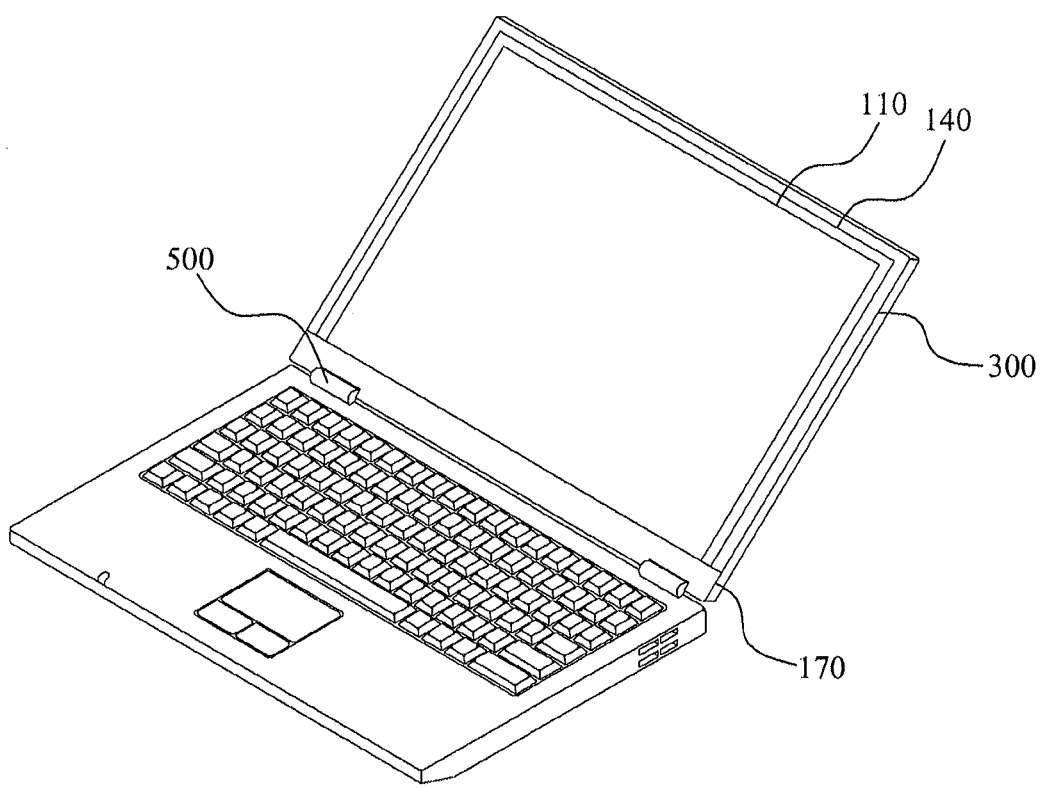
FIG. 1 is a perspective view of a display device according to one embodiment of the present invention.
Figure 2:
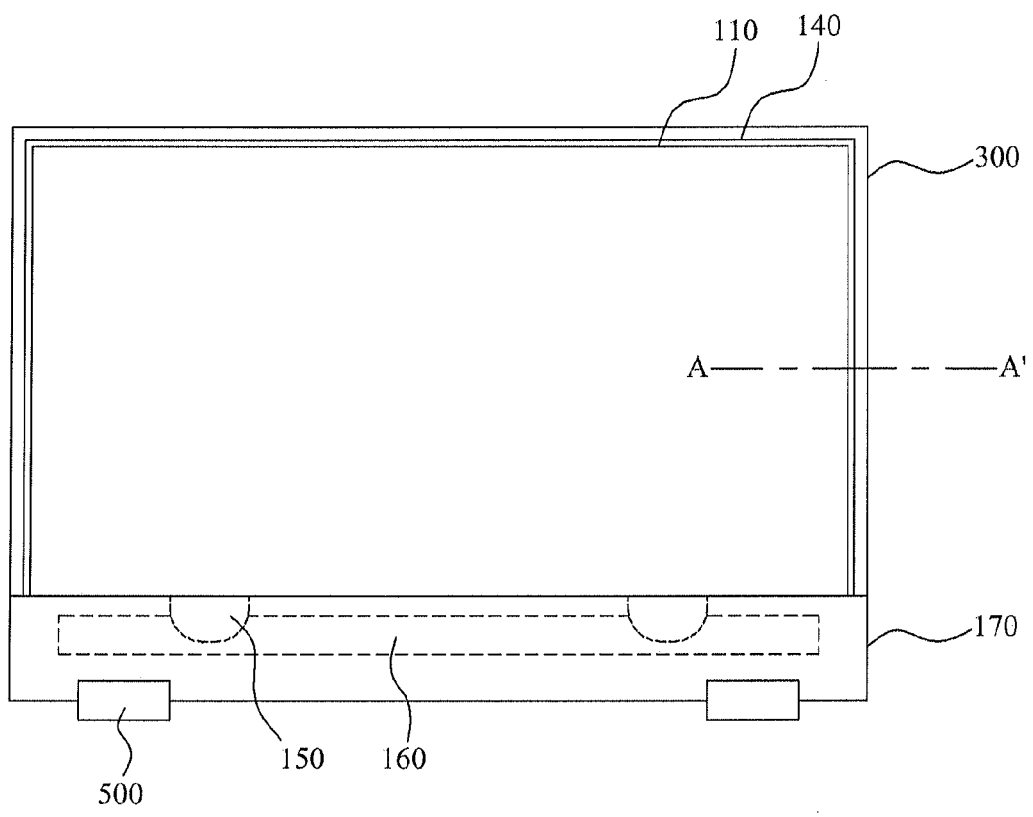
FIG. 2 is a plane view of a display device according to one embodiment of the present invention.
Figure 3:
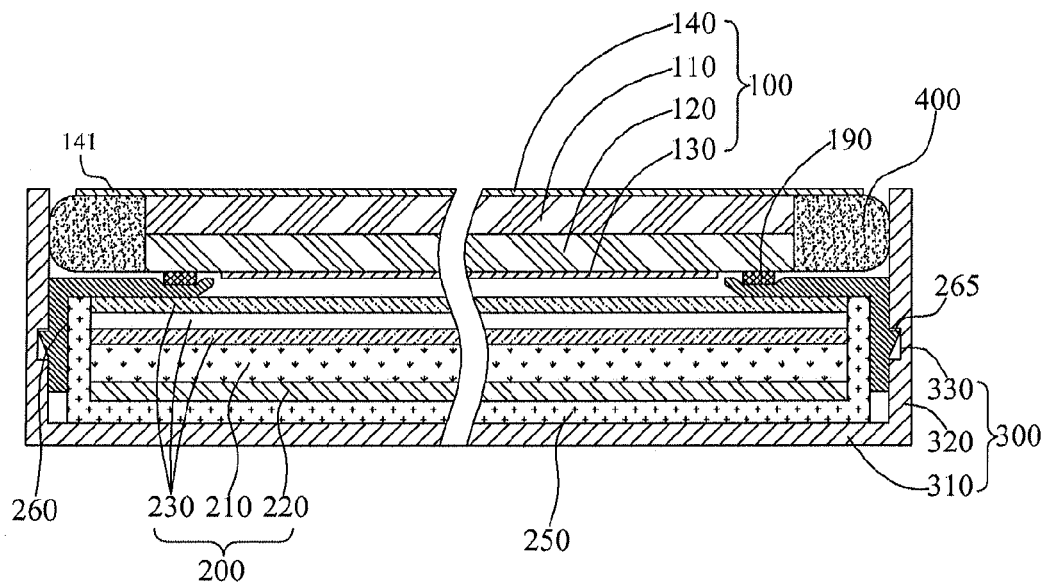
FIG. 3 is a cross sectional view along A-A of FIG. 2.

FIG. 1 is a perspective view of a display device according to one embodiment of the present invention. FIG. 2 is a plane view of a display device according to one embodiment of the present invention. FIG. 3 is a cross sectional view along A-A of FIG. 2.

As known from FIGS. 1 to 3, the display device according to one embodiment of the present invention may include a display panel 100, a deco cover 170, a backlight unit 200, a cover member 300, and a bumper 400.

The display panel 100 may include an upper substrate 110; a lower substrate 120 confronting the upper substrate 110, wherein the upper and lower substrates 110 and 120 are bonded to each other with a liquid crystal layer (not shown) interposed therebetween; a lower polarizing film 130 on a rear surface of the lower substrate 120; and a film member 140 on a front surface of the upper substrate 110, wherein the film member 140 is longer than the upper substrate 110.

The lower substrate 120 includes a plurality of gate lines (not shown), a plurality of data lines (not shown), and a plurality of pixels (not shown), wherein each pixel is defined by the gate and data lines crossing each other. Each pixel may include a thin film transistor (not shown) connected with the gate line and data line; a pixel electrode connected with the thin film transistor; and a common electrode formed close to the pixel electrode and supplied with a common voltage. According to a driving method of liquid crystal layer, the common electrode may be formed on the upper substrate 110. Also, light transmittance of the liquid crystal layer may be controlled by forming an electric field corresponding to a differential voltage between common voltage and data voltage applied to each pixel.

The upper substrate 110 includes a color filter corresponding to each pixel of the lower substrate 120. The upper substrate 110 and lower substrate 120 confronting each other are bonded to each other with the liquid crystal layer interposed therebetween. In this case, according to a driving method of liquid crystal layer, the common electrode supplied with the common voltage may be formed on the upper substrate 110.

On the basis of modes, for example, TN (Twisted Nematic) mode, VA (Vertical Alignment) mode, IPS (In-Plane Switching) mode, and FFS (Fringe Field Switching) mode, the lower substrate 120 and upper substrate 110 may be formed in various detailed structures which are generally known to those in the art.

The lower polarizing film 130 may be attached to the rear surface of the lower substrate 120. The lower polarizing film 130 attached to the rear surface of the lower substrate 120 polarizes the light emitted from the backlight unit 200 to the display panel 100.

The film member 140 is formed on the front surface of the upper substrate 110. The film member 140 includes an extending part 141 extending in longitudinal direction on the upper substrate 110. The film member 140 may be an upper polarizing film which polarizes the light emitted to the external through the upper substrate 110.

The extending part 141 may extend more than the end of the upper substrate 110 in at least one direction. As shown in FIG. 2 illustrating one embodiment of the present invention, the extending part 141 may extend more than the upper substrate 110 toward three sides of the display panel 100. The above three sides of the display panel 100 correspond to the three sides except the lower side with a plurality of circuit films 150, as shown in FIG. 2.

According to one embodiment of the present invention, FIG. 2 illustrates that the extending part 141 extends in the three sides of the display panel 100, but it is not limited to this case. If needed, the extending part 141 may extend in one or more sides of the display panel 100.

As shown in FIG. 2, the display device according to one embodiment of the present invention may further include the plurality of circuit films 150 connected with a pad prepared in the peripheral region of the lower substrate 120, the peripheral region corresponding to the first side of the display panel 100; a PCB (printed circuit boards) 160 connected with the plurality of circuit films 150; the deco cover 170 connected with the cover member 300 to cover the pad, the plurality of circuit films 150 and the PCB 160; and a joint hinge 500. In this case, the first side of the display panel 100 may be a long side in the lower substrate 120.

Each of the circuit films 150 is provided with a data driving IC (integrated circuit, not shown) for supplying a data signal to the display panel 100. In the lower substrate 120 of the display panel 100, there can be a gate driving circuit (not shown) which supplies a gate (or scan) signal to the display panel 100. The plurality of circuit films 150 may be attached to the PCB 160 and pad of the display panel 100 by TAB (Tape Automated Bonding) process, wherein the circuit films 150 may be formed of TCP (Tape Carrier Package) or COF (Chip On Flexible Board or Chip On Film). Accordingly, the display panel 100 is electrically connected with the PCB 160 by the plurality of circuit films 150.

The PCB 160 electrically connected with the plurality of circuit films 150 may supply various signals for displaying images on the display panel 100. The PCB 160 is provided with a timing controller (not shown) for controlling driving of the display panel 100, various power circuits (not shown), and a memory device (not shown).

The deco cover 170 is connected with the cover member 300, to thereby prevent exposure of the plurality of circuit films 150, the PCB160 and the pad in the display panel 100 by covering them. According to one embodiment of the present invention, the deco cover 170 may include a hook member (not shown) joined with the cover member 300.

When the display device according to the present invention is used for a notebook computer shown in FIG. 1, the joint hinge 500 may join the display panel 100 with a main body. Thus, in some cases, if the display device according to the present invention is used for a monitor or TV, the joint hinge 500 may be omitted.

The backlight unit 200 includes a light guide plate 210, a reflective sheet 220, and an optical member 230, which are received in the cover member 300.

The light guide plate 210 is formed in shape of plate (or wedge), and the light guide plate 210 guides light emitted from a light source (not shown) toward the display panel 100. In this case, the light source may include fluorescent lamp or light emitting diode.

The reflective sheet 220 is provided under the light guide plate 210, and the reflective sheet 220 reflects the light guided by the light guide plate 210 toward the display panel 100.

The optical member 230 is provided on the light guide plate 210, and the optical member 230 improves luminance properties of the light proceeding toward the display panel 100 from the light guide plate 210. For this, the optical member 230 may include at least one diffusion sheet and at least one prism sheet.

Meanwhile, the display device according to one embodiment of the present invention may further include a support case 250 and a guide frame 260.

The support case 250 is received in the cover member 300, wherein the Support case 250 supports the guide frame 260, and simultaneously receives the backlight unit 200 therein. For this, the support case 250 includes a support plate for supporting the backlight unit 200, and a support sidewall vertically bent from the end of the support plate.

According to one embodiment of the present invention, the guide frame 260 is formed in a rectangular frame having a cross section shaped in "]" so that the guide frame 260 is received in the cover member 300 and is also placed onto the support sidewall. The guide frame 260 is connected with the rear side of the display panel 100 by an adhesive member 190. For this, the guide frame 260 may include a horizontal panel joining part joined with the adhesive member 190; a guide sidewall perpendicularly bent from the horizontal panel joining part and joined with the cover member 300; and a first joining member 265 protruding from the guide sidewall.

The panel joining part is formed in a plate shape facing the rear side of the display panel 100. This panel joining part may include a hollow for easy placement of the adhesive member 190. In this case, it is preferable that the adhesive member 190 be joined with the lower substrate 120 of the display panel 110, however, it is not limited to this structure. For instance, the adhesive member 190 may be joined with the lower polarizing film 130. The adhesive member 190 may be double-sided tape or adhesive.

The guide sidewall is perpendicularly bent from one side of the panel joining part adjacent to the cover member 300, and is joined with the cover member 300.

The first joining member 265 protrudes from the outer surface of the guide sidewall, wherein the first joining member 265 includes a jaw having an inclined surface. According to one embodiment of the present invention, the first joining member 265 has a cross section of a right triangle on the outer surface of the guide sidewall.

According to one embodiment of the present invention, the cover member 300 may include a set plate 310, a vertical part 320, and a second joining member 330.

The cover member 300 receives the display panel 100 therein, and covers the lateral surface of the display panel 100. The cover member 300 supports the support case 250 receiving the aforementioned backlight unit 200 therein, and also covers the lateral surfaces of the display panel 100 and guide frame 260, whereby the cover member 300 functions rear and lateral covers of the manufactured display device.

The set plate 310 formed in a plate shape supports the support case 250 receiving the aforementioned backlight unit 200, whereby the set plate 310 functions as the rear cover of the manufactured display device. According to one embodiment of the present invention, the set plate 310 may be connected with the support case 250 by a plurality of screws engaged with the support plate of the support case 250.

The vertical part 320 is perpendicularly bent from the end of the set plate 310. In this case, the vertical part 320 may have a height corresponding to the film member 140 of the display panel 100. This vertical part 320 covering the lateral surfaces of the display panel 100 and guide frame 260 is exposed to the external so that the vertical part 320 functions as the lateral cover of the manufactured display device. Also, the vertical part 320 having the height corresponding to the film member 140 enables to remove height difference in the border areas, thereby achieving the good appearance in view of design.

The second joining member 330 has a hollow from the inner sidewall of the vertical part 320, whereby it is joined with the first joining member 265. Thus, the first joining member 265 is inserted into the second joining member 330 so that the guide frame 260 and the cover member 300 are mutually joined together. In this case, the jaw of the first joining member 265 prevents the first joining member 265 from being separated from the second joining member 330. Also, the inclined surface of the jaw enables to easily join the first and second joining members 265 and 330 with each other.

The aforementioned embodiment of the present invention shows that the guide frame 260 and the cover member 300 are mutually joined together, but not necessarily. The guide frame 260 and the support sidewall of the support case 250 may be mutually joined together. In this case, the cover member 300 may be connected with the support case 250 by the plurality of screws engaged between the set plate 310 and the support plate of the support case 250.

The bumper 400 is provided between the cover member 300 and the lateral side of the display panel 100, wherein the bumper 400 supports the rear surface of the extending part 141. The bumper 400 covers the lateral side of the display panel 100, and the bumper 400 extends longitudinally from the lateral side of the display panel 100. More particularly, the bumper 400 may extend more than the end of the extending part 141 in the longitudinal direction.

The bumper 400 may be formed of silicon based or ultraviolet ray (UV) curable sealant or a UV-curable resin. However, in consideration of tack time, the bumper 400 may be formed of UV curable sealant. In this case, viscosity of the sealant is within a range of 1500~30000 cps, but not necessarily. Also, the sealant may be colorless (or transparent), or colored (for example, blue, red, or black), but not limited to these. In consideration for design of the display device, the color of the sealant may be selectively determined.

Accordingly, the bumper 400 prevents the film member 140 from coming off the upper substrate 110. Also, the bumper 400 prevents the display panel 100 from being brought into direct contact with the cover member 300, whereby the bumper 400 functions as a buffer against shock. Thus, it enables to obtain a smaller border width in the display device, and simultaneously to remove height difference in the border areas, thereby increasing the visual size in the screen of the display device, and achieving the good appearance in view of design.

Figure 4:
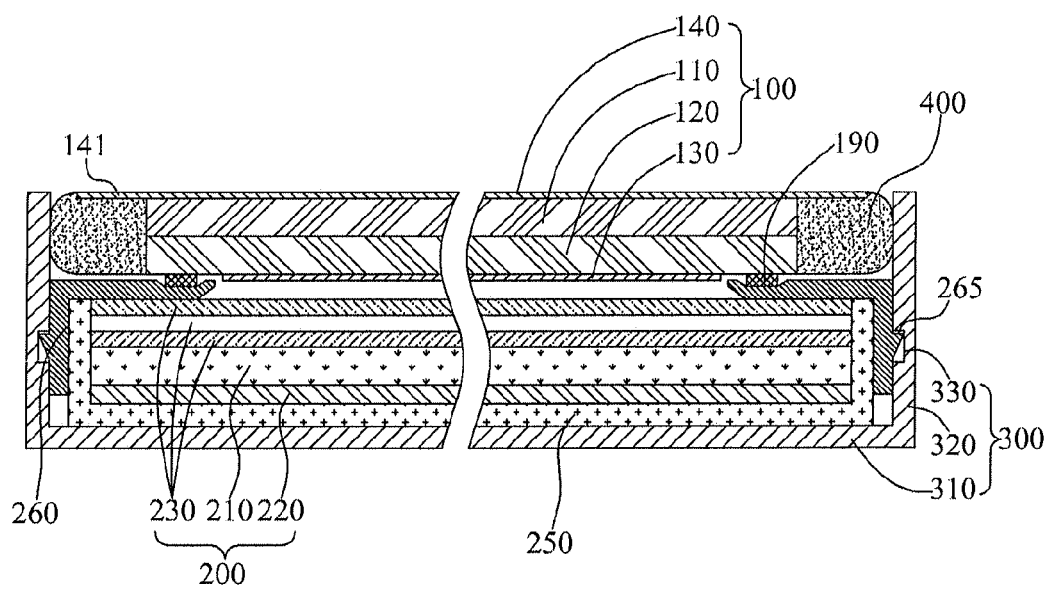
FIG. 4 is a cross sectional view of a display device according to another embodiment of the present invention.

FIG. 4 is a cross sectional view of a display device according to another embodiment of the present invention. Hereinafter, for convenience of explanation, repetitive descriptions for the same parts as those shown in FIGS. 1 to 3 will be omitted.

As known from FIG. 4, a bumper 400 is provided between the cover member 300 and the lateral side of the display panel 100. The bumper 400 covers the lateral side of the display panel 100, and the bumper 400 extends from the lateral side of the display panel 100, and more particularly, extends more than the end of the extending part 141 in the longitudinal direction. Also, the bumper 400 supports the rear surface and lateral sides of the extending part 141, thereby preventing the film member 140 from coming off the upper substrate 110, and simultaneously preventing moisture permeation. Furthermore, the bumper 400 prevents the display panel 100 from being brought into direct contact with the cover member 300, whereby the bumper 400 functions as a buffer against shock.

Figure 5:
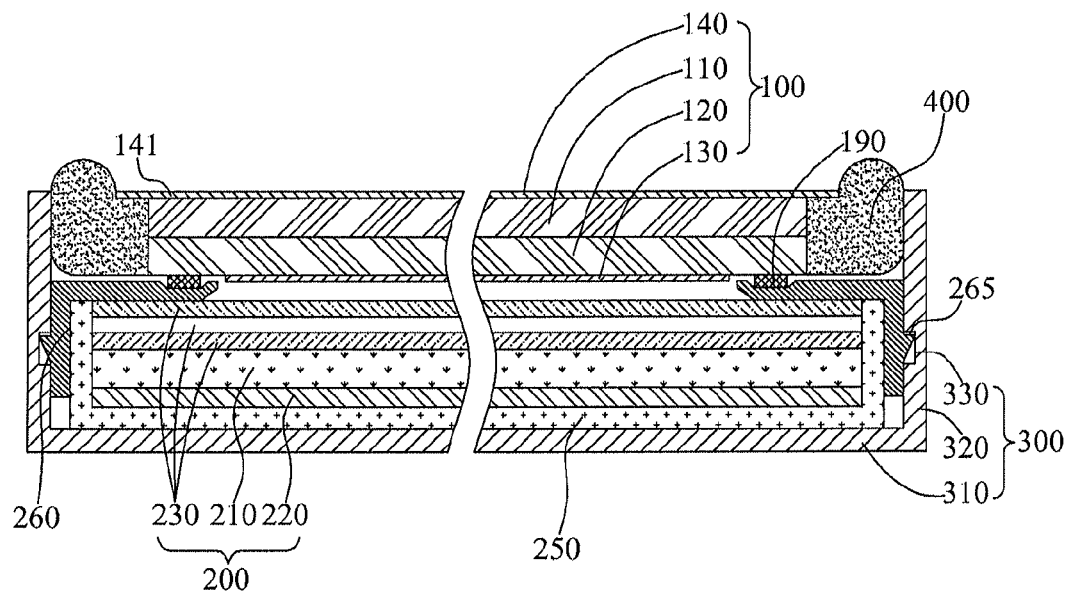
FIG. 5 is a cross sectional view of a display device according to another embodiment of the present invention.

FIG. 5 is a cross sectional view of a display device according to another embodiment of the present invention. Hereinafter, for convenience of explanation, repetitive descriptions for the same parts as those shown in FIGS. 1 to 3 will be omitted.

As known from FIG. 5, a bumper 400 is provided between the cover member 300 and the lateral side of the display panel 100. At an interval between the extending part 141 and the cover member 300, the bumper 400 is formed in such a manner that a height of the bumper 400 is higher than that of the film member 140.

The bumper 400 covers the lateral side of the display panel 100, and the bumper 400 extends from the lateral side of the display panel 100, and more particularly, extends more than the end of the extending part 141 in the longitudinal direction. Also, the bumper 400 supports the rear surface of the extending part 141, thereby preventing the film member 140 from coming off the upper substrate 110. Furthermore, the bumper 400 prevents the display panel 100 from being brought into direct contact with the cover member 300, whereby the bumper 400 functions as a buffer against shock.

In the end of the extending part 141, the bumper 400 is higher than the film member 140, to thereby prevent the display panel 100 from being pressed. For example, when the display device of the present invention is used for a notebook computer shown in FIG. 1, the above structure enables to prevent the display panel 100 from being loaded.

Figure 6:
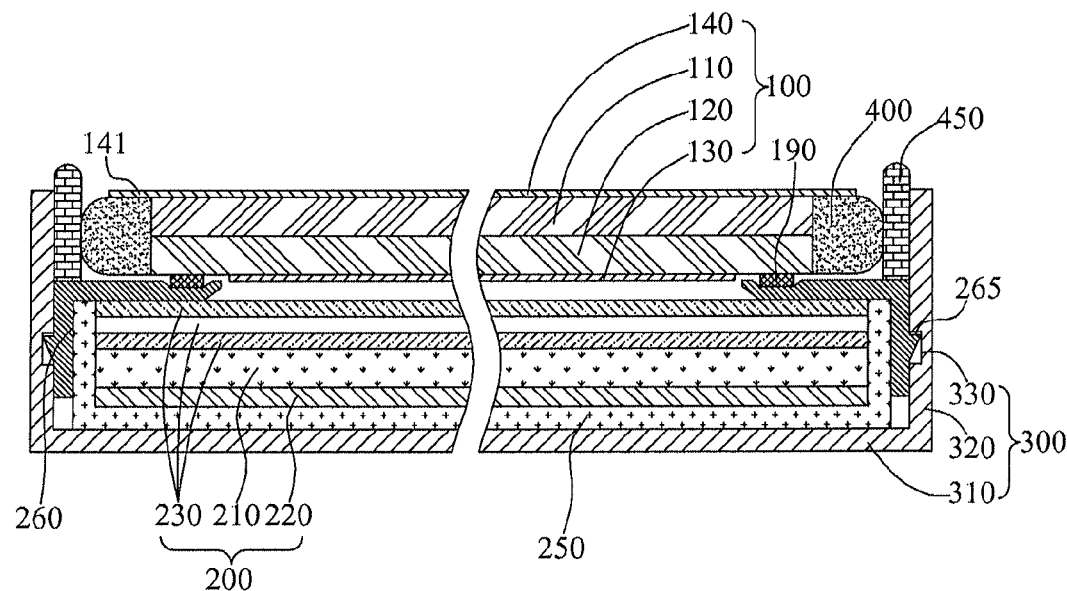
FIG. 6 is a cross sectional view of a display device according to another embodiment of the present invention.

FIG. 6 is a cross sectional view of a display device according to another embodiment of the present invention. Hereinafter, for convenience of explanation, repetitive descriptions for the same parts as those shown in FIGS. 1 to 3 will be omitted.

A support pad 450 is formed between the cover member 300 and the bumper 400, and more particularly, formed to contact the vertical part 320. The support pad 450 is supported by one end of the guide frame 260. The support pad 450 has a height which is higher than the display panel 100.

The support pad 450 may be formed of an elastic material capable of absorbing shock. According to one example, the support pad 450 may include a material such as rubber, urethane or polycarbonate. Also, the support pad 450 may be colorless (or transparent), or colored (for example, blue, red, or black), but not necessarily. In consideration for design of the display device, the color of the support pad 450 may be selectively determined.

Between the end of the extending part 141 and the vertical part 320, the support pad 450 is higher than the film member 140, to thereby prevent the display panel 100 from being pressed by a plate-shaped object. For example, when the display device of the present invention is used for a notebook computer shown in FIG. 1, the above structure enables to prevent the display panel 100 from being pressed under the condition the notebook computer is closed.

Figure 7:
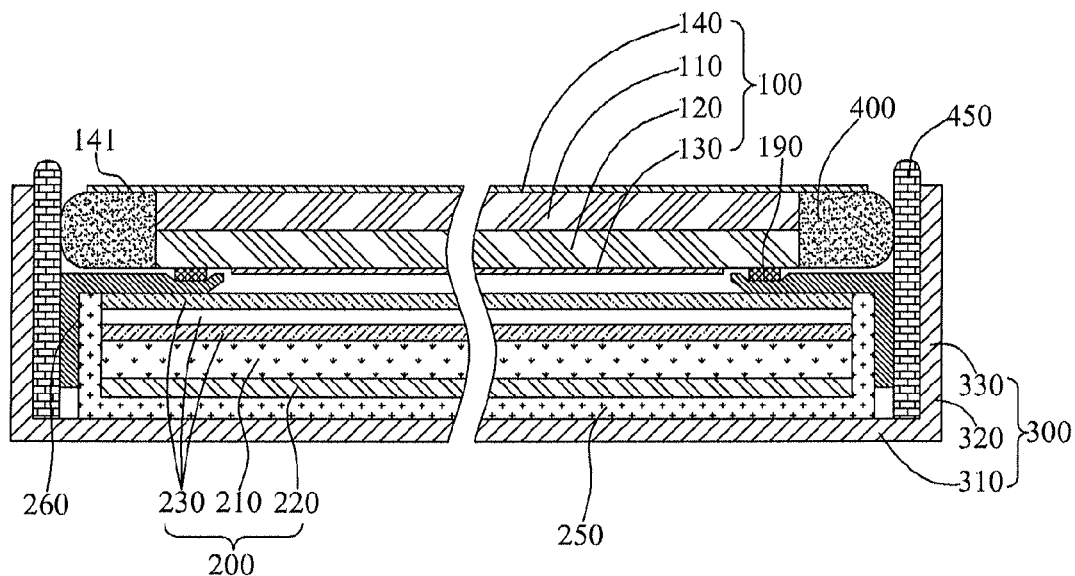
FIG. 7 is a cross sectional view of a display device according to another embodiment of the present invention.

FIG. 7 is a cross sectional view of a display device according to another embodiment of the present invention. Hereinafter, for convenience of explanation, repetitive descriptions for the same parts as those of the above embodiment will be omitted.

A support pad 450 is formed between the cover member 300 and the bumper 400, and more particularly, formed to contact the vertical part 320. The support pad 450 is supported by one end of the set plate 310. The support pad 450 has a height which is higher than the display panel 100.

Figure 8:
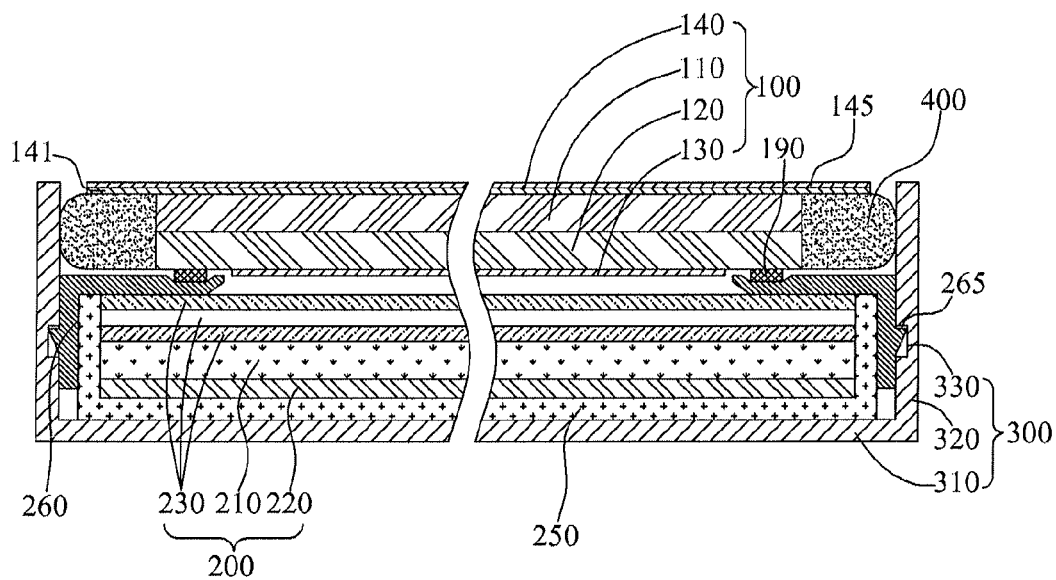
FIG. 8 is a cross sectional view of a display device according to another embodiment of the present invention.

FIG. 8 is a cross sectional view of a display device according to another embodiment of the present invention. Hereinafter, for convenience of explanation, repetitive descriptions for the same parts as those of the above embodiment will be omitted.

A retarder film 145 is formed on an entire front surface of the film member 140. The retarder film 145 may include a plurality of first retarder patterns formed at fixed intervals, and a plurality of second retarder patterns, wherein each second retarder pattern is interposed between each of the first retarder patterns.

The retarder film 145 is joined with the front surface of the film member 140, wherein the retarder film 145 is provided for separation of images seen through the left and right eyes. For this, the retarder film 145 includes the plurality of first retarder patterns which overlap with a vertical or horizontal line of the display panel 100 displayed with the left-eye image; and the plurality of second retarder patterns, wherein each second retarder pattern is interposed between each of the first retarder patterns while being overlapped with the vertical or horizontal line of the display panel 100 displayed with the right-eye image. The first and second retarder patterns change optical axes of the left-eye image and right-eye image.

A height of the vertical part 320 corresponds to that of the retarder film 145, which enables the good appearance of the display device.

LCD products may be manufactured by the aforementioned respective display devices including the display panel 100 and the backlight unit 200 according to the embodiments of the present invention, but not necessarily. The display panel 100 may be substituted with an organic light emitting display panel (OLED panel). In this case, the OLED panel can emit light in itself, whereby it is possible to omit the backlight unit 200, and furthermore the support case 250.

In this case, the display panel 100 of the OLED panel may include a lower substrate, and an upper substrate confronting the lower substrate, wherein the lower and upper substrate confronting each other are bonded to each other.

The lower substrate includes a plurality of light-emitting cells formed in every region defined by gate line, data line, and power line. Each of the light-emitting cells may include at least one switching transistor connected with the gate line and data line; at least one driving transistor connected with the switching transistor and power (VDD) line; and a light-emitting device which emits light according to a current controlled by switching of the driving transistor.

The upper substrate is bonded to the lower substrate while confronting the lower substrate, wherein the upper substrate protects the light-emitting device on the lower substrate.

The aforementioned film member may be provided on the upper substrate in the display panel 100 of the OLED panel.

Figure 9A:
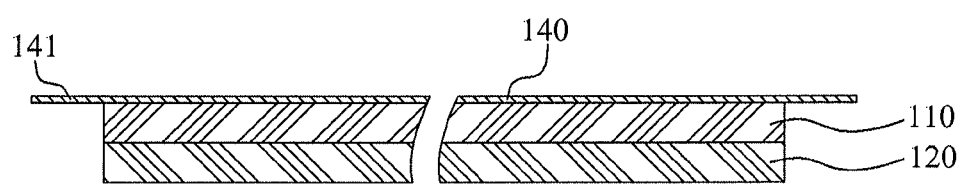
FIGS. 9A to 9C illustrate a method for manufacturing the display device according to the present invention.
Figure 9B:
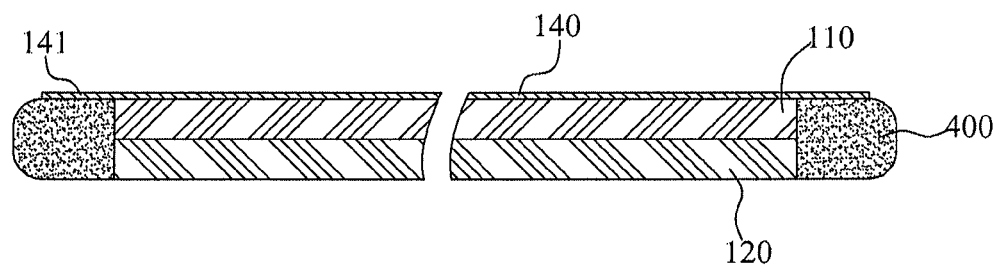
Figure 9C:
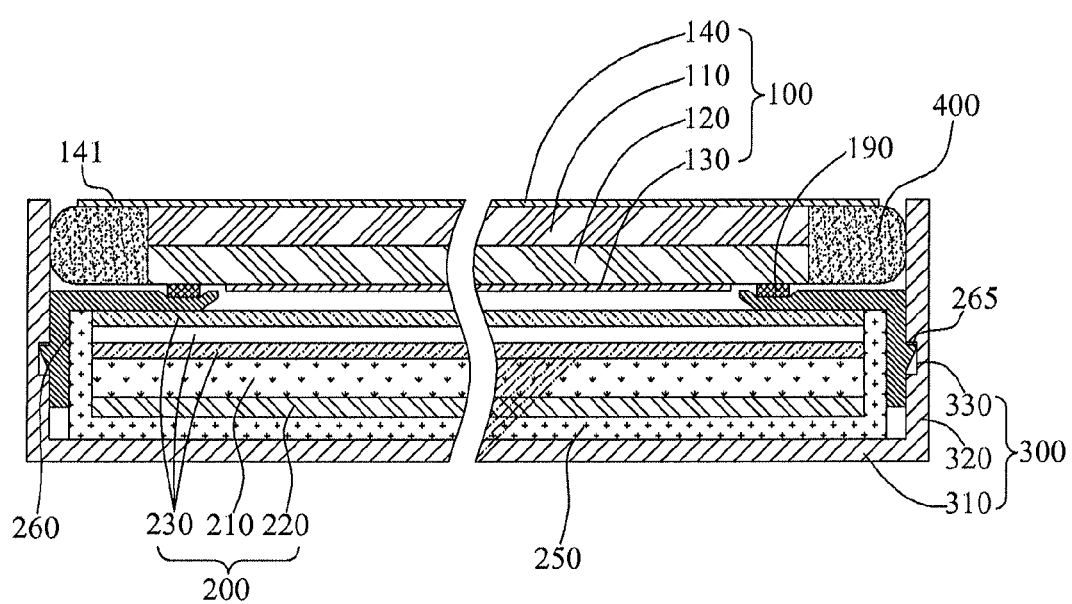

FIGS. 9A to 9C illustrate a method for manufacturing the display device according to the present invention.

First, as shown in FIG. 9A, the film member 140 may extend on the front surface of the upper substrate 110, wherein the film member 140 is longer in the longitudinal direction than the upper substrate 110.

In this case, the film member 140 includes the extending part 141 formed on the front surface of the upper substrate 110, wherein the extending part 141 extends more than the upper substrate 110 in longitudinal direction. The film member 140 may be the upper polarizing film which polarizes the light emitted to the external through the upper substrate 110.

The extending part 141 may extend more than the end of the upper substrate 110 in at least one direction.

A method for forming the film member 140 may further include cutting the film member 140 so as to have the extending part 141 which extends more than the end of the upper substrate 110 in the longitudinal direction. The film member 140 having the extending part 141 which extends more than the end of the upper substrate 110 in the longitudinal direction may be directly formed on the front surface of the upper substrate 110; or the film member 140 may be firstly formed on the upper substrate 110, and then secondly cut to have the extending part 141 which extends more than the end of the upper substrate 110 in the longitudinal direction.

In this case, the film member 140 may be cut by the use of laser.

Then, the bumper 400 extends from the lateral side of the upper substrate 110, wherein the bumper 400 supports the film member 140, and the bumper 400 extends more than the end of the film member 140 in the longitudinal direction.

For the above explanation about the display device according to the embodiment of the present invention, various embodiments of the bumper 400 are already shown, whereby the various shapes of bumper 400 will not be described in order to avoid redundancy.

Next, the upper substrate 110, film member 140, and bumper 400 are received in the cover member 300 supporting the lateral side of the bumper 400.

According to the above method for manufacturing the display device of the present invention, it is possible to achieve the good appearance in the display device which obtains a smaller thickness and a smaller border width, and removes the height difference in the border areas by drastically removing the upper case and front set cover. In addition, the bumper provided between the display panel and the cover member enables to prevent the separation of film member, and to prevent the moisture permeation into the inside of the display panel.

According to the present invention, the upper case and the front set cover are removed so as to obtain a smaller thickness and a smaller front border width in the liquid crystal display device, to thereby achieve the good appearance of the liquid crystal display device.

Also, the bumper is provided between the display panel and the cover member, thereby preventing the separation of film member, and preventing the moisture permeation into the display panel.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A display device comprising:
   a display panel including an upper substrate, a lower substrate confronting the upper substrate, and a film member having a rear surface attached to a front surface of the upper substrate, and a front surface forming an outward surface of the display device;
   a cover member receiving the display panel, and covering a lateral side of the display panel; and
   a bumper between the lateral side of the display panel and the cover member,
   wherein the film member comprises an extending part which extends beyond an end of the upper substrate in a longitudinal direction and the bumper supports the rear surface of the extending part, extends beyond the end of the extending part in the longitudinal direction, and extends, in an orthogonal direction, at least to the rear surface of the extending part.

2. The display device according to claim 1, wherein the extending part extends in a latitudinal direction also, and the bumper extends beyond the extending part in a latitudinal direction also.

3. The display device according to claim 1, wherein the extending part extends in both longitudinal directions, and the bumper extends beyond the end of the extending part in both longitudinal directions.

4. The display device according to claim 1, wherein the extending part extends in a latitudinal direction, and the bumper extends beyond the end of the extending part in one of the latitudinal direction.

5. The display device according to claim 1, wherein the bumper covers a lateral side of the extending part.

6. The display device according to claim 1, wherein the bumper extends above a top surface of the extending part.

7. The display device according to claim 6, wherein the cover member includes a vertical part covering a lateral side of the display panel, and a height of the vertical part corresponds to the top surface of the display panel.

8. The display device according to claim 1, further comprising a support pad between the cover member and the film member, the support pad being higher than the display panel.

9. The display device according to claim 8, wherein the support pad is made of one of rubber, urethane, or polycarbonate.

10. The display device according to claim 1, further comprising a retarder film joined with the front surface of the film member.

* * * * *